(12) United States Patent
Goerlich et al.

(10) Patent No.: US 8,960,170 B2
(45) Date of Patent: Feb. 24, 2015

(54) INTERNAL COMBUSTION ENGINE

(75) Inventors: Leszek Goerlich, Leonberg (DE); Yakup Özkaya, Kornwestheim (DE); Stefan Ruppel, Heidelberg Emmertsgrund (DE)

(73) Assignee: Mahle International GmbH (DE)

( * ) Notice: Subject to any disclaimer, the term of this patent is extended or adjusted under 35 U.S.C. 154(b) by 141 days.

(21) Appl. No.: 13/571,616

(22) Filed: Aug. 10, 2012

(65) Prior Publication Data

US 2013/0061832 A1 Mar. 14, 2013

(30) Foreign Application Priority Data

Aug. 10, 2011 (DE) .......................... 10 2011 080 783

(51) Int. Cl.
| | |
|---|---|
| *F02B 25/06* | (2006.01) |
| *F01M 13/02* | (2006.01) |
| *F16L 33/30* | (2006.01) |
| *F16L 39/02* | (2006.01) |
| *F02M 25/06* | (2006.01) |
| *F01M 13/04* | (2006.01) |

(52) U.S. Cl.
CPC .............. *F01M 13/022* (2013.01); *F16L 33/30* (2013.01); *F16L 39/02* (2013.01); *F02M 25/06* (2013.01); *F01M 13/04* (2013.01); *F01M 13/0416* (2013.01); *F01M 13/023* (2013.01); *F01M 2013/027* (2013.01)
USPC ......................................................... 123/572

(58) Field of Classification Search
CPC ... F01M 13/04; F01M 13/022; F01M 13/023; F01M 13/0416; F02M 25/06
USPC ......................................................... 123/572
See application file for complete search history.

(56) References Cited

U.S. PATENT DOCUMENTS

| | | | | |
|---|---|---|---|---|
| 3,589,347 A | * | 6/1971 | Sawada | 123/574 |
| 5,964,207 A | * | 10/1999 | Clauss et al. | 123/572 |
| 2005/0022795 A1 | | 2/2005 | Beyer et al. | |
| 2007/0144501 A1 | * | 6/2007 | Joergl et al. | 123/568.12 |
| 2008/0152519 A1 | * | 6/2008 | Chern | 417/430 |
| 2009/0301446 A1 | | 12/2009 | Asanuma et al. | |

(Continued)

FOREIGN PATENT DOCUMENTS

| | | |
|---|---|---|
| DE | 10249720 | 5/2004 |
| DE | 10320054 | 11/2004 |
| DE | 202004011882 | 1/2006 |

(Continued)

OTHER PUBLICATIONS

English abstract for DE-10249720.

(Continued)

*Primary Examiner* — Lindsay Low
*Assistant Examiner* — Charles Brauch
(74) *Attorney, Agent, or Firm* — Rader, Fishman & Grauer PLLC

(57) ABSTRACT

A combustion engine, in particular that of a motor vehicle, includes a ventilation device for feeding gases of a crankcase of the combustion engine enclosing at least one crankshaft to an air feed of the combustion engine, wherein the air feed feeds an airflow rate to the combustion engine. An adapter device may fluidically connect a full load path of the ventilation device to a full load line of the ventilation device and a part load path of the ventilation device to a part load line of the ventilation device.

18 Claims, 2 Drawing Sheets

(56) References Cited

U.S. PATENT DOCUMENTS

2009/0308364 A1 12/2009 Konohara
2010/0313830 A1 12/2010 Ruppel et al.

FOREIGN PATENT DOCUMENTS

| | | |
|---|---|---|
| DE | 102006058072 | 6/2008 |
| DE | 102009008831 A1 | 8/2010 |
| DE | 102010004805 | 7/2011 |
| JP | 2009293464 | 12/2009 |
| WO | WO-2008041113 | 4/2008 |

OTHER PUBLICATIONS

English abstract for DE-102010004805.
English abstract for DE-102009008831.
EP Search Report for EP12178928.3.

* cited by examiner

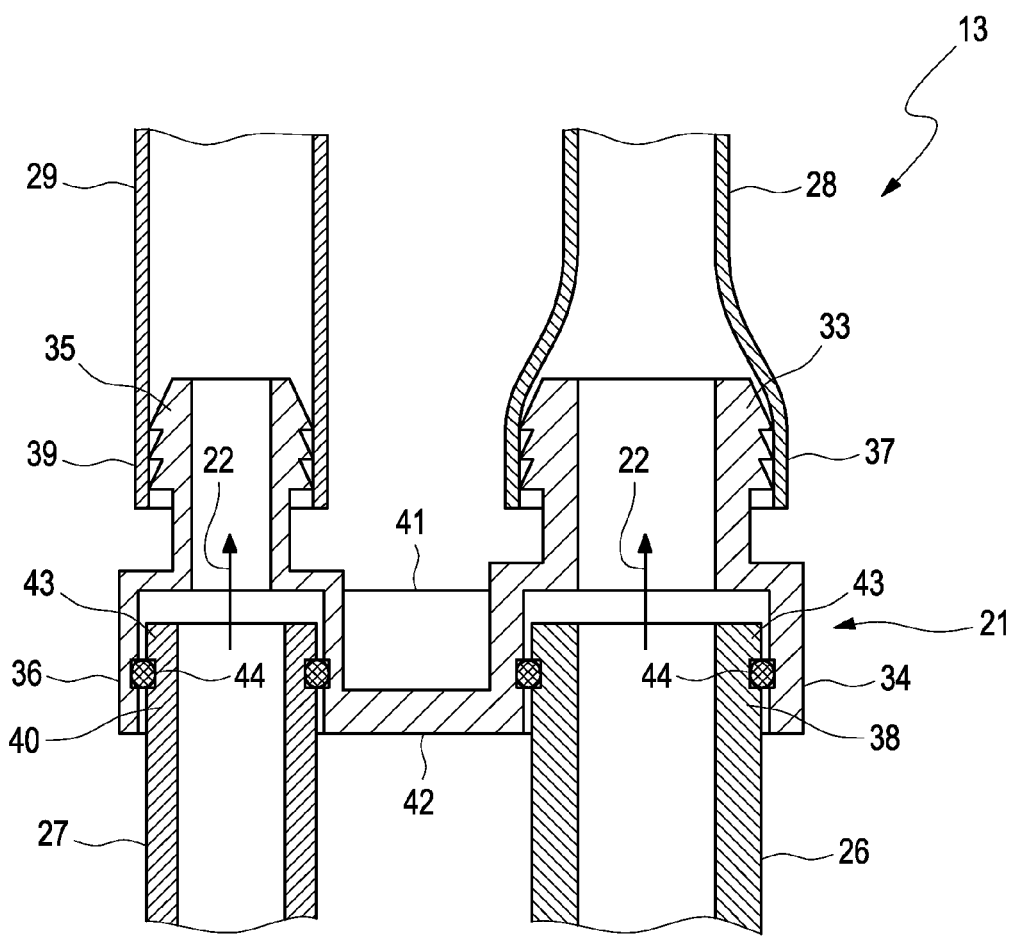
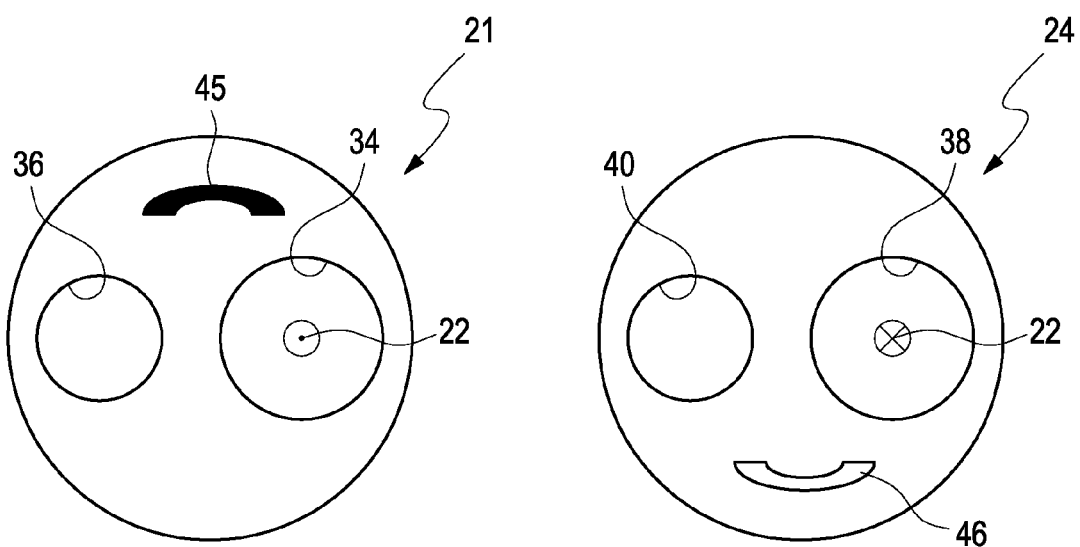
Fig. 3 a  Fig. 3 b

INTERNAL COMBUSTION ENGINE

CROSS-REFERENCE TO RELATED APPLICATION

This application claims priority to German patent application DE 10 2011 080 783.7 filed on Aug. 10, 2011, which is hereby incorporated by reference in its entirety.

TECHNICAL FIELD

The present invention relates to a combustion engine, in particular of a motor vehicle. The present invention furthermore relates to an adapter device for such a combustion engine.

BACKGROUND

The air necessary for the combustion process is usually fed to a combustion engine via an air feed. As a rule, this air is conducted into a combustion chamber delimited by a cylinder via an inlet valve. For driving a piston, an air-fuel mixture is ignited in the respective combustion chamber. Because of this, exhaust gas is created, a certain amount of which can enter a crankcase passed the piston. Here, the crankcase encloses at least one crankshaft, which is connected to the respective piston. In order to avoid a positive pressure in the crankcase created through these blow-by gases, the combustion engine usually comprises a ventilation device, which fluidically connects the crankcase to the air feed. Thus, the blow-by gases are conducted to the air feed, wherein the ventilation device can comprise an oil mist separator, which separates the blow-by gases from their oil component, thus returning the oil thus obtained back to an oil reservoir of the crankcase through a fluidic connection. As a rule, the air feed comprises a throttling device as well as a charging device, wherein the charging device serves for the power increase of the combustion engine, in particular upon a full load of the combustion engine. Practically, the ventilation device can also be divided into a full load feed and a part load feed, while the full load feed leads into the air feed upstream of the charging device and the part load feed leads into the air feed downstream of the throttling device. Since the gases returned to the air feed via the ventilation device are environmentally harmful, it is important to avoid escaping of these gases into the environment. In addition to this, such a leak results in ambient air being sucked in through the air feed and thus to a fault in the operation of the combustion engine.

To avoid and detect such a leak, a combustion chamber is known for example from DE 103 20 054 A1 which comprises air sensors within the ventilation device and the air feed.

The multi-component construction of the ventilation device, in particular the division into part load feed and full load feed however can additionally result in that a leak within the ventilation device cannot be avoided or detected. Thus, for example during the assembly of the ventilation device, a part of the ventilation device cannot be correctly installed or a leak within one of the feeds of the ventilation device is not detected, in particular by the sensor device.

SUMMARY

The present invention therefore deals with the problem of stating an improved or at least alternative embodiment for a combustion engine of the type mentioned at the outset, which is characterized in particular by an improved avoidance or detection of leaks within a ventilation device of the combustion engine.

The present invention is based on the general idea of ensuring a tight and simplified assembly of a ventilation device of a combustion engine and a simplified detection of leaks within the ventilation device through an adapter device, which is arranged within the ventilation device and fluidically connects sections of a full load feed of the ventilation device and of a part load feed of the ventilation device with one another in such a manner that a separation within one of these feeds inevitably leads to a separation within the other feed. Here, the ventilation device on the one hand is fluidically connected to an air feed for feeding the combustion engines with air and on the other hand to a crankcase of the combustion engine, wherein the crankcase encloses at least one crankshaft of the combustion engine. The ventilation device thus serves in particular the purpose of conducting gases, in particular blow-by gases, from the crankcase to the air feed. Here, the air feed comprises a throttling device for regulating an airflow rate fed to the combustion engine via the air feed. Furthermore, the air feed comprises a charging device, in particular a compressor of the charging device, which serves for the power increase of the combustion engine, in particular with a full load of the combustion engine. The division of the ventilation device into the part load feed and the full load feed thus serves the purpose in particular of satisfying a full load operation or a part load operation of the combustion engine, wherein the full load feed leads into the air feed upstream of the charging device with respect to the flow direction of the charging air, while the part load feed leads into the air feed downstream of the throttling device. The arrangement of the adapter device within the ventilation device furthermore leads to a division of the full load feed into a full load line and a full load path and the division of the part load feed into a part load line and a part load path. Here, the respective lines, with respect to the gases conducted from the crankcase to the air feed, are arranged downstream of the adapter device, while the paths are arranged upstream of the adapter device. The full load feed thus comprises in particular a full load path, which is arranged upstream of the adapter device and, via the adapter device, is fluidically connected to a full load line, which is arranged downstream of the adapter device. The same applies to the part load feed, i.e. the part load feed comprises in particular a part load path, which is arranged upstream of the adapter device and via the adapter device is fluidically connected to a part loan line, which is arranged downstream of the adapter device.

As previously mentioned, a separation or a leak within the part load feed or within the full load feed can result in that such a leak cannot be reliably detected in particular by a control/regulating device of the combustion engine. The present invention thus utilises in particular the knowledge that a reliable and easy detection and thus avoidance of such leaks is guaranteed when a leak within the full load feed leads to a leak within the part load feed or when a leak within the part load feed leads to a leak within the full load feed. This is the case, in particular in the event of a leak within the full load feed, because in this case through an additional sucking-in of ambient air through the charging device, the detection of such a leak is particularly difficult.

In accordance with the inventive idea, the ventilation device comprises an adapter device having four connections. Furthermore, the full load feed is divided into a full load path leading from the crankcase to the adapter device and into a full load line leading from the adapter device to the air feed, wherein the full load line leads into the air feed upstream of the charging device. In addition, the part load feed of the ventilation device is divided into a part load path leading from the crankcase to the adapter device and into a part load line leading from the adapter device to the air feed, wherein the part load line leads into the air feed downstream of the throttling device. Here, the adapter device fluidically connects the full load path to the full load line and the part load path to the part load line at the same time. The connection between the full load path and the full load line in this case is realised via a first connection of the adapter device, which is connected to a full load line connection of the full load line. To this end, the first connection of the adapter device is practically designed complementarily to the full load line connection. The first connection of the adapter device and the full load line connection are thus embodied in particular in such a manner that they can be coupled to each other. These connections thus can for example be designed such that one of the connections can be arranged within the other connection. The first connection of the adapter device furthermore is fluidically connected within the adapter device to a second connection of the adapter device, wherein the second connection of the adapter device is designed complementarily to a full load path connection. Furthermore, the second connection of the adapter device is fluidically connected to the full load path connection, in particular through the complementary design. Thus, a fluidic connection within the full load feed, i.e. a fluidic connection between the full load line and the full load path is ensured. The adapter device furthermore comprises a third connection, which is connected to a part load line connection of the part load line. To this end, the third connection of the adapter device and the part load line connection are designed complementarily to each other. A fluidic connection within the part load feed is now ensured via a fourth connection of the adapter device, which is fluidically connected within the adapter device to the third connection of the adapter device and is additionally fluidically connected to a part load path connection of the part load path. To this end, the fourth connection and the part load path connection are designed in particular complementarily to each other. The complementary design of the respective associated connections in particular serves the purpose here of arranging one of the associated connections within the other associated connection.

A simplified assembly or a simplified establishment of the adapter device in this case is ensured in particular when the first and the third connection of the adapter device are arranged on a side of the adapter device, in particular on a line side of the adapter device facing the lines. Accordingly, the second and the fourth connection of the adapter device are practically arranged on another, in particular opposite side of the adapter device. With an advantageous embodiment, this opposite side corresponds to a path side of the adapter device facing the paths.

According to a further advantageous embodiment, the ventilation device comprises an oil mist separator. The oil mist separator in this case serves the purpose in particular of freeing the gases to be fed from the crankcase to the air feed of any oil components. The oil mist separator thus ensures that merely oil-free gases enter the air feed through the ventilation device. With a particularly advantageous embodiment, the combustion engine comprises an oil line, which fluidically connects the oil mist separator to the crankcase. Here, the oil line preferentially leads into a region of the crankcase, which is assigned to an oil reservoir of the crankcase. The oil line in this case serves the purpose of returning the oil obtained from the oil mist separator to the crankcase. In addition, the oil mist separator is preferentially arranged within the path section of the ventilation device. Here, particular attention is drawn to an arrangement, wherein the oil mist separator is directly arranged on the crankcase.

The oil mist separator furthermore can be assigned to both the full load feed or the full load path as well as to the part load feed or the part load path. With a possible embodiment, the oil mist separator is thus fluidically connected to the crankcase, in particular on the upstream side via a single feed. A separation into the full load feed and the part load feed is thus realised on the downstream side of the oil mist separator in this case.

With a particularly preferred embodiment, the full load path connection as well as the part load path connection are directly arranged on the oil mist separator. The full load path connection and the part load path connection are thus arranged in particular on the downstream side directly on the oil mist separator and accordingly optionally form the division of the ventilation device into a full load feed or into a full load path and a part load feed or a part load path. The full load path connection and the part load path connection can additionally or alternatively be integrated in the oil mist separator. In this case, said connections are designed for example as fluidic connections integrated in the oil mist separator.

With a further preferred embodiment of the invention, the full load path comprises at least one valve. The valve in this case is preferentially arranged downstream of the oil mist separator. Optionally or additionally, the part load path likewise comprises a valve, which is arranged in particular also downstream of the oil mist separator. Here, the division of the ventilation device into a full load path and a part load path can be realised directly downstream of the oil mist separator. In this case, said valves are arranged in particular directly downstream of the separation into full load path and part load path. Here, the valves can be of any type, while they are preferentially constructed as non-return valves. The ventilation device thus comprises a non-return valve each in particular within the full load path and/or the part load path. The non-return valves in this case serve the purpose in particular of ensuring the fluidic connection between the crankcase and the air feed for a gas flow from the crankcase to the air feed and stop an opposite flow. This is practical in particular when the crankcase has a negative pressure relative to the air feed.

When the part load path and the full load path each comprise a valve, which are in particular on the downstream side and directly on the oil mist separator, the full load path connection and the part load path connection with a further preferred embodiment are arranged directly on the valves. This means in particular that the full load path connection is arranged directly on the downstream side of the valve of the full load path. In addition, the part load path connection in particular is thus arranged directly on the downstream side of the valve of the part load path. Here, the full load path connection and/or the part load path connection can be integrated for example in said valves, in particular in a housing of the valve.

It is pointed out that the oil mist separator and the valves of the full load path or of the part load path can be jointly arranged within a housing of the combustion engine. Thus, they can for example be arranged in a cylinder head cover of the combustion engine.

According to a further preferred embodiment, the full load path connection and/or the part load path connection of the adapter device is directly arranged on the cylinder head cover. Here, the full load path connection and the part load path connection can be integrated in particular in the cylinder head cover. This is preferentially the case when the oil mist separator and/or the valves of the full load path and of the part load path are arranged within the cylinder head cover. The ventilation device thus extends into the cylinder head cover in this case.

In order to avoid defective assembly of the full load path connection and of the part load path connection to the second and to the fourth connection of the adapter device, in particular a switched connection, the adapter device and the associated section of the ventilation device are designed in such a manner that such a confusion or defective connection is not possible. Thus, the path side of the adapter device in particular and a path section of the ventilation device interacting with the former are designed complementarily to each other. To this end, with a particularly preferred embodiment, the adapter device on its path side, i.e. on the upstream side, has a receptacle while the associated section of the ventilation device, i.e. in particular the path section, has a mandrel or protrusion. Here, the receptacle of the adapter device and the protrusion of the ventilation device are designed complementarily to each other. The receptacle and the path are thus designed in particular in such a manner that the protrusion is arranged in the receptacle in an accurately fitting manner. The receptacle and the protrusion are furthermore arranged in/on the adapter device/ventilation device, and/or are shaped in such a manner that they merely permit a predetermined position for connecting the full load path connection and the part load path connection to the adapter device. The adapter device thus, in particular, comprises a receptacle on the upstream side, i.e. on its path side which is arranged in particular outside the second and the fourth connection, while the path section of the ventilation device comprises a complementarily shaped protrusion, which in particular is arranged outside the full load path connection and the part load path connection. With an equivalent solution, the ventilation device, in particular the path section of the ventilation device, comprises a receptacle, while the adapter device, in particular on the path side, comprises a protrusion that is shaped complementarily to this receptacle and interacting with said receptacle. Embodiments, wherein the adapter device and/or the ventilation device comprise a plurality of receptacles and/or complementarily shaped protrusions are also expedient and are therefore part of the scope of this invention.

With a further embodiment, the full load path connection and the part load path connection have different shapes and/or different sizes. Thus, the second and the fourth connection of the adapter device practically also have different shapes and/or sizes. This now serves the purpose in particular of avoiding a defective assembly. It is thus avoided in particular that the full load path connection is connected to the fourth connection of the adapter device or it is avoided that the part load path connection is connected to the second connection of the adapter device. In addition or alternatively, the full load line connection and the part load line connection have different shapes and/or sizes. Thus, the first and the third connection of the adapter device are practically embodied differently. This also serves the purpose in particular of avoiding a defective assembly of the full load line connection and of the part load line connection to the adapter device. It is thus also avoided in particular that the full load line connection is connected to the second connection of the adapter device, while the part load line connection is connected to the first connection of the adapter device.

The different embodiment of the full load path connection and of the part load path connection or of the full load line connection and of the part load line connection in this case do not necessarily result in that the full load path and the part load path or the full load line and the part load line have different shapes and sizes. With a preferred embodiment, however, the full load path and the full load line are designed larger than the part load path and the part load line. The full load path and the full load line thus make available to the gases flowing through them a larger cross section than the part load line or the part load path. This is practical in particular since the combustion engine under full load converts larger gas grades than under part load. Such an embodiment of the paths and does not in inevitably result in that the paths and the lines have the same shape and/or size over the entire course of the ventilation device.

With a further embodiment, the full load line is embodied as a hose. Optionally or additionally, the part load line is embodied as a hose. Embodying the lines as hose in this case ensures a cost-effective production and the flexibility of these lines, which facilitates in particular the assembly of the ventilation device.

With a preferred embodiment, the full load line connection and/or the part load path connection are embodied as part of these hoses. The full load line connection and/or the part load line connection are thus embodied in particular as ends of the hoses on the upstream side. These ends in this case can have a shape and/or size that is/are different from the rest of the hose. The full load line connection and/or the part load line connection in this case can be designed in particular as expanded ends of the full load line or of the part load line.

Designing the full load line and/or part load line as hoses or designing the full load line connection and/or the part load line connection as hose ends additionally facilitates in particular the connection between the line connections and the connections of the adapter device. To this end, the first connection and/or the third connection of the adapter device with a preferred embodiment comprise a sawtooth-like shape. The saw teeth of the first and/or of the third connection of the adapter device in this case are preferentially arranged radially along the first and/or the third connection. The first and/or the third connection of the adapter device and thus the corresponding saw teeth in this case are preferentially arranged within the full load line connection and/or the part load line connection. Additionally, the first connection and/or the fourth connection of the adapter device can have a larger radius than the associated full load line connection and/or part load line connection. Together with the arrangement of the corresponding connections of the adapter device within the full load line connection and/or the part load line connection, this leads to a fixed connection between the line connections and the adapter device, in particular through the establishment of a tension on the corresponding ends of the hoses.

The full load path and/or the part load path can also be correspondingly embodied as hoses. Here, too, the full load path connection and/or the part load path connection are then preferentially embodied as ends of these hoses on the downstream side. Here, a connection to the adapter device can be realised through an arrangement of the hose ends within the associated connections of the adapter device, i.e. of the second and the fourth connection. To this end, the full load path connection and/or the part load path connection at their downstream ends can comprise a shoulder, which in particular follows a radial course. Each of these shoulders can additionally interact with a ring arranged within the second and the fourth connection and thus ensure a connection between the associated connections.

The abovementioned realisations of the connections between the associated connections of the full load feed and the part load feed result in particular in that the line connections have a stronger connection to the adapter device than the part connections. This is the case with a particularly preferred embodiment, i.e. the connections between the lines and the adapter device are more strongly connected to one another than the path connections with the associated connections of the adapter device independently of the respective realisation of the connection. This results in that disconnecting one of the path connections from the associated connection of the adapter device leads to the disconnection of the other path connection from the associated adapter connection.

According to a further embodiment, the ventilation device comprises a pressure valve. The pressure valve in this case is preferentially arranged between the crankcase and the adapter device. With a particular preferred embodiment, the pressure control valve in this case is arranged directly downstream of the oil mist separator. The pressure control valve in this case can be assigned both to the full load path as well as to the part load path. Thus, a common path feed of the part load path and of the full load path leads in particular from the downstream side of the oil mist separator to the pressure control valve. A division of the path feed into the full load path and into the part load path thus takes place in particular directly on the downstream side of the pressure control valve. The pressure control valve in this case, in particular when the oil mist separator is arranged within the cylinder head cover, can be arranged within the cylinder head cover.

It is to be understood that the adapter device as an important part of the present invention as such is also part of the scope of this invention.

Further important features and advantageous of the invention are obtained from the subclaims, from the drawings and from the associated Figure description by means of the drawings.

It is to be understood that the features mentioned above and still to be explained in the following cannot only be used in the respective combination stated by also in other combinations or by themselves, without leaving the scope of the present invention.

BRIEF DESCRIPTION OF THE DRAWINGS

Preferred exemplary embodiments of the invention are shown in the drawings and are explained in more detail in the following description, wherein same reference characters relate to same or similar or functionally same components.

It shows, in each case schematically.

DETAILED DESCRIPTION

Figure 1:
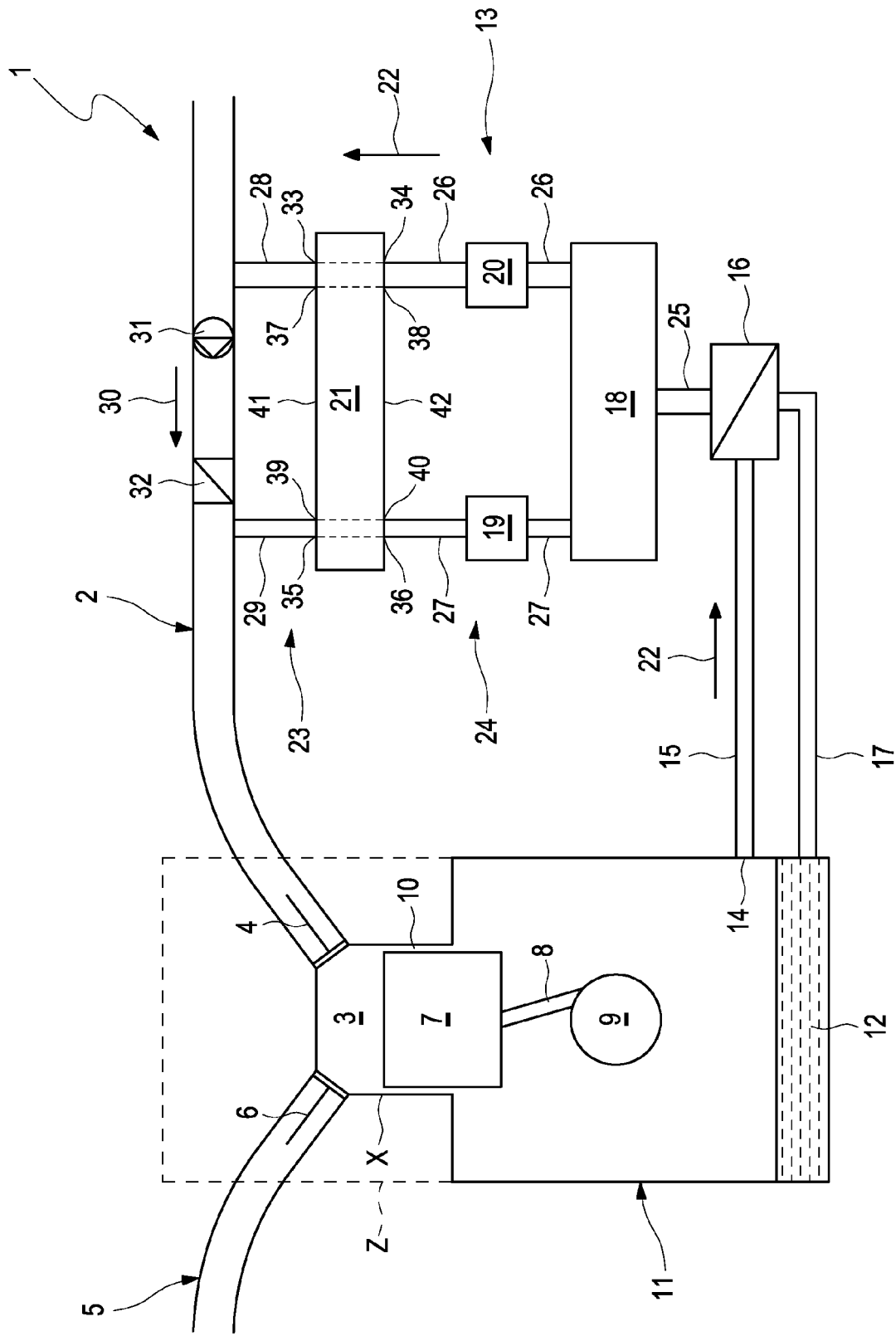
FIG. 1 a highly simplified embodiment of a combustion engine in the manner of a circuit diagram, FIG. 2 a longitudinal section of a ventilation device, FIG. 3 cross sections through a ventilation device and an associated adapter device.

According to FIG. 1, a combustion engine 1 comprises an air feed 2, which feeds a combustion chamber 3 of the combustion engine 1 with air. To this end, the air feed 2 is fluidically connected to the combustion chamber 3, wherein an inlet valve 4 controls the feed of the combustion chamber 3 with air via the air feed 2. The combustion chamber 3 furthermore is fluidically connected to an exhaust discharge 5, wherein an exhaust valve 6 controls the flow of the exhaust gas out of the combustion chamber 3. The combustion chamber 3 is delimited by a piston 7 on the side located opposite the inlet valve 4 or the exhaust valve 5, which piston is arranged in an axially moveable manner in a cylinder X enclosing the combustion chamber 3 in circumferential direction. On the side facing away from the combustion chamber 3, the piston 7 is connected to a crankshaft 9 via a connecting rod 8. Here, the exhaust gases that are generated in the combustion chamber 3 can enter a crankcase 11 in particular through ring gaps 10 between the cylinder X and the piston 7. Here, the crankcase 11 encloses the crankshaft 9 and comprises an oil reservoir 12. The so-called blow-by gases that have entered the crankcase 11 are conducted from the crankcase 11 to the air feed 2 via a ventilation device 13. To this end, the crankcase 11 comprises a crankcase outlet 14, which is fluidically connected to an oil mist separator 16 by means of a feed 15. The oil mist separator 16 furthermore is connected through an oil line 17 to the oil reservoir 12 of the crankcase 11. Thus, the oil separated from the blow-by gas can be fed to the oil reservoir 12. The feed 15 conducts the blow-by gas to the air feed 2 via the oil mist separator 16, a pressure control valve 18, two non-return valves 19, 20 and an adapter device 21. The flow direction of the blow-by gases within the ventilation device 13 in this case is indicated by an arrow 22. A cylinder cover Z furthermore encloses in particular parts of the cylinder X, of the air feed 2 and of the exhaust discharge 5.

The adapter device 21 in this case divides the feed 15 on the downstream side into a line section 23 and on the upstream side into a path section 24. The oil mist separator 16 is thus arranged within the path section 24 or a path feed 25 and on the upstream side fluidically connected to the crankcase 11. The oil mist separator 16 furthermore is fluidically connected to the pressure control valve 18 on the upstream side through a single path of the path feed 25. The path feed 25 thus leads into the pressure control valve 18 on the upstream side of the pressure control valve 18. On the downstream side of the pressure control valve 18, the path feed 25 is divided into a full load path 26 and a part load path 27. The full load path 26 arranged on the right in the shown representation, in this case fluidically connects the pressure control valve 18 to a non-return valve 20. The part load path 27 furthermore establishes a fluidic connection between the pressure control valve 18 and the further non-return valve 19 within the part load path 27. The full load path 26 and the part load path 27 furthermore each connect these non-return valves 19, 20 to the adapter device 21 on the downstream side of the non-return valves 19, 20. The adapter device 21 in this case fluidically connects the full load path 26 to a full load line of the line feed 23. The adapter device 21 furthermore fluidically connects the part load path 27 to a part load line 29 of the line section 23. The line section 23 is thus divided on the downstream side of the adapter device 21 into the full load line 28 and the part load line 29. The full load line 28 in this case leads into the air feed 2 upstream of a charging device 31 of the air feed 2 with respect to an airflow direction of the air feed 2 indicated by an arrow 30, whereas the part load line 29 leads into the air feed 2 on the downstream side of a throttling device 32 of the air feed 2. Thus, the full load line 28 and the part load line 29 are each fluidically connected to the air feed 2.

For the fluidic connection of the full load path 26 to the full load line 28 and for the part load path 27 to the part load line 29, the adapter device 21 comprises four connections 33, 34, 35, 36. A first connection 33 of the adapter device 21 in this case is arranged on the downstream side of the adapter device 21 and shaped complementarily to a full load line connection 37 of the full load line 28. The full load line connection 37 to this end is formed on an upstream end of the full load line 28 and together with the first connection 33 of the adapter device 21, establishes a fluidic connection that is tight to the outside between the full load line 28 and the first connection 33 of the adapter device 21. The first connection 33 of the adapter device 21 is furthermore fluidically connected to a second connection 34 of the adapter device 21 within the adapter device 21. The second connection 34 of the adapter device 21 in this case interacts with a full load path connection 38, wherein the full load path connection 38 is arranged on a downstream end of the full load path 26. The second connection 34 of the adapter device 21 and the full load path connection 38 in this case are designed complementarily to each other in such a manner that they establish a fluidic connection that is tight to the outside. The adapter device 21 on the downstream side comprises a third connection 35, which interacts with a part load line connection 39 of the part load line 29 and thus establishes a fluidic connection. To this end, the third connection 35 of the adapter device 21 and the part load line connection 39 are shaped complementarily to each other. The third connection 35 of the adapter device 21 is additionally fluidically connected to a fourth connection 36 of the adapter device 21 within the adapter device 21. The fourth connection 36 of the adapter device 21 is furthermore connected to a part load path connection 40, which is arranged on a downstream end of the part load path 27. The first and the third connection 33, 35 of the adapter device 21 are thus arranged on a line side 41 of the adapter device 21, while the second connection 34 and the fourth connection 36 of the adapter device 21 are arranged on a path side 42 of the adapter device 21.

A possible realisation of the connections between connections of the ventilation device 13 is shown in FIG. 2. In the embodiment shown here, both the full load line 28 and the part load line 29 as well as the full load path 26 and the part load path 27 are embodied as hoses. The full load line connection 37 in this case is arranged on a downstream end of the full load line 28 and embodied as an expansion of the full load line 28. The first connection 33 embodied in a sawtooth-like manner of the adapter device 21 embodied unitarily in this case is arranged within the full load line connection 37. Through a larger embodiment, the first connection 33 of the adapter device 21 additionally tensions the full load line connection 37, thus ensuring a fixed connection between the first connection 33 of the adapter device 21 and of the full load line connection 37. The first connection 33 of the adapter device arranged on the line side 41 merges on the upstream side into the second connection 34 of the adapter device 21 through a step-like transition. The full load path connection 38 arranged on the downstream of the full load path 26 in this case is arranged within the second connection 34 of the adapter device 21. The full load path connection 38 in this case comprises a radially arranged shoulder 43 on the downstream edge, which through interacting with a ring radially arranged within the second connection 34 of the adapter device 21 establishes a connection between the second connection 34 and the full load path connection 38. The connection between the third connection 35 and the part load line connection 39 is ensured in the same manner as the connection between the first connection 33 and the full load path connection 39, wherein the part load line connection 39 is arranged on the upstream end of the part load line connection 29 and in contrast with the full load line connection 37 is not embodied as expansion of the full load line 28. In addition, the full load line 28 and the full load path 26 are designed larger than the part load line connection 29 and the part load path 27.

To avoid a switched connection of the adapter device 21 to the associated path section 24 of the ventilation device 13, the adapter device 21, according to FIG. 3a, comprises a protrusion 45 on its path side 42, which interacts with a receptacle 46 of the path section 24 as shown in FIG. 3b. To this end, the protrusion 45 and the receptacle 46, as shown in the cross sections of FIGS. 3a and 3b, are designed complementarily to each other. In addition, the second connection 34 and the fourth connection 36 of the adapter device 21 have different sizes, while the full load path connection 38 and the part load path connection 40 practically also have different sizes. This ensures in particular a predetermined assembly position, as a result of which an error in the assembly of the adapter device 21 with the corresponding path connections 38, 40 of the path section 24 is avoided.

The invention claimed is:
1. A combustion engine, of a motor vehicle, comprising: an air feed for feeding the combustion engine with air and a crankcase enclosing a crankshaft, wherein
the air feed includes a charging device and a throttling device,
the charging device is arranged upstream of the throttling device,
the crankcase is fluidically connected to the air feed through a ventilation device,
a full load line of the ventilation device includes a full load line connection that leads into the air feed upstream of the charging device,
a part load line of the ventilation device includes a part load line connection that leads into the air feed downstream of the throttling device,
an adapter device is arranged between the full load line and a full load path of the ventilation device, fluidically connecting these to each other,
the adapter device is arranged between the part load line and a part load path of the ventilation device, fluidically connecting these to each other,
the adapter device includes a first connection, which is designed complementarily to the full load line connection and connected to the latter,
the adapter device includes a second connection, which is designed complementarily to a full load path connection of the full load path and can be coupled to the latter,
the first connection and the second connection in the adapter device are fluidically connected to each other,
the adapter device includes a third connection, which is designed complementarily to the part load line connection and connected to the latter,
the adapter device includes a fourth connection, which is designed complementarily to a part load path connection of the part load path and coupled to the latter,
the third connection and the fourth connection in the adapter device are fluidically connected to each other,
an oil mist separator of the ventilation device for separating oil and gas is arranged between the crankcase and the adapter device and is assigned to the part load path and the full load path,
the full load path includes at least one valve, a non-return valve, which is arranged downstream of the oil mist separator, and
the part load path includes at least one valve, a non-return valve, which is arranged downstream of the oil mist separator.
2. The combustion engine according to claim 1, the full load path connection and the part load path connection are arranged directly on a cylinder head cover (Z) of the combustion engine.
3. The combustion engine according to claim 1 wherein the first and the third connection of the adapter device are arranged on a line side of the adapter device and the second and the fourth connection are arranged on an opposite path side of the adapter device.
4. The combustion engine according to claim 1, wherein at least one of the full load line is embodied as a hose and the part load line is embodied as a hose.

5. The combustion engine according to claim 4, wherein at least one of the full load line connection and the part load line connection are embodied as part of these hoses, as an end section of the hoses.

6. The combustion engine according to claim 3, wherein the first connection and the third connection of the adapter device are sawtooth-like and are arranged within at least one of the associated hoses and line connections and thus are connected to these.

7. The combustion engine according to claim 1,
wherein at least one of the full load path connection is inserted into and thus connected to the second of the adapter device, and
wherein the part load path connection is inserted into and thus connected to the fourth connection of the adapter device.

8. The combustion engine according to claim 1, wherein at least one of
the adapter device, on the path side, includes a receptacle and the associated section of the ventilation device, the path section, includes a protrusion that is shaped complementarily to the receptacle, and
in that the adapter device, on the path side, a protrusion and the associated section of the ventilation device, the path section, comprises a receptacle that is shaped complementarily to the protrusion.

9. The combustion engine according to claim 1, the ventilation device includes a pressure control valve, which is arranged between the crankcase and the adapter device and is assigned to the part load path and the full load path.

10. The combustion engine according to claim 1, wherein the combustion engine includes an oil line for the return flow of the oil from the oil mist separator to the crankcase.

11. The combustion engine according to claim 1, wherein the full load path connection and the part load path connection are arranged directly on the cylinder head cover (Z) of the combustion engine.

12. The combustion engine according to claim 4, wherein the first connection and the third connection of the adapter device are sawtooth-like and are arranged within at least one of the associated hoses and line connection and thus are connected to these.

13. The combustion engine according to claim 5, wherein at least one of
the full load path connection is inserted into and thus connected to the second of the adapter device, and
the part load path connection is inserted into and thus connected to the fourth connection of the adapter device.

14. The combustion engine according to claim 6, wherein at least one of
the adapter device, on the path side, includes a receptacle and the associated setion of the ventilation device, the path section, includes a protrusion that is shaped complementary to a receptacle, and
the adapter device, on the path side, includes a protrusion and the associated section of the ventilation device, the path section, includes a receptacle that is shaped complementarily to the protrusion.

15. The combustion engine according to claim 1, wherein the adapter device is a one-piece body.

16. The combustion engine according to claim 1, wherein the full load path connection and the part load path connection are directly arranged on the oil mist separator.

17. A combustion engine, of a motor vehicle, comprising:
an air feed for feeding the combustion engine with air and a crankcase enclosing a crankshaft, wherein
the air feed includes a charging device and a throttling device,
the charging device is arranged upstream of the throttling device,
the crankcase is fluidically connected to the air feed through a ventilation device,
a full load line of the ventilation device includes a full load line connection that leads into the air feed upstream of the charging device,
a part load line of the ventilation device includes a part load line connection that leads into the air feed downstream of the throttling device,
an adapter device is arranged between the full load line and a full load path of the ventilation device, fluidically connecting these to each other,
the adapter device is arranged between the part load line and a part load path of the ventilation device, fluidically connecting these to each other,
the adapter device includes a first connection, which is designed complementarily to the full load line connection and connected to the latter,
the adapter device includes a second connection, which is designed complementarily to a full load path connection of the full load path and can be coupled to the latter,
the first connection and the second connection in the adapter device are fluidically connected to each other,
the adapter device includes a third connection, which is designed complementarily to the part load line connection and connected to the latter,
the adapter device includes a fourth connection, which is designed complementarily to a part load path connection of the part load path and coupled to the latter,
the third connection and the fourth connection in the adapter device are fluidically connected to each other,
an oil mist separator of the ventilation device for separating oil and gas is arranged between the crankcase and the adapter device and is assigned to the part load path and the full load path,
the full load path includes at least one valve, a non-return valve, which is arranged downstream of the oil mist separator,
the part load path includes at least one valve, a non-return valve, which is arranged downstream of the oil mist separator, and
the full load path connection and the part load path connection are arranged directly on the valves.

18. A combustion engine, of a motor vehicle, comprising:
an air feed for feeding the combustion engine with air and a crankcase enclosing a crankshaft, wherein
the air feed includes a charging device and a throttling device,
the charging device is arranged upstream of the throttling device,
the crankcase is fluidically connected to the air feed through a ventilation device,
a full load line of the ventilation device includes a full load line connection that leads into the air feed upstream of the charging device,
a part load line of the ventilation device includes a part load line connection that leads into the air feed downstream of the throttling device,
an adapter device is arranged between the full load line and a full load path of the ventilation device, fluidically connecting these to each other,
the adapter device is arranged between the part load line and a part load path of the ventilation device, fluidically connecting these to each other, the adapter device includes a first connection, which is designed complementarily to the full load line connection and connected to the latter, the adapter device includes a second connection, which is designed complementarily to a full load path connection of the full load path and can be coupled to the latter, the first connection and the second connection in the adapter device are fluidically connected to each other, the adapter device includes a third connection, which is designed complementarily to the part load line connection and connected to the latter, the adapter device includes a fourth connection, which is designed complementarily to a part load path connection of the part load path and coupled to the latter, the third connection and the fourth connection in the adapter device are fluidically connected to each other, the full load path includes at least one valve, a non-return valve, which is arranged downstream of an oil mist separator, and the part load path includes at least one valve, a non-return valve, which is arranged downstream of the oil mist separator.

\* \* \* \* \*

UNITED STATES PATENT AND TRADEMARK OFFICE
CERTIFICATE OF CORRECTION

PATENT NO. : 8,960,170 B2  
APPLICATION NO. : 13/571616  
DATED : February 24, 2015  
INVENTOR(S) : Goerlich et al.

Page 1 of 1

It is certified that error appears in the above-identified patent and that said Letters Patent is hereby corrected as shown below:

In the Claims:

At column 10, claim 2, line 56, please add "wherein" after "claim 1,".

It should read as follows, "claim 1, wherein the full".

At column 11, claim 14, line 52, please change "setion" to "section".

Signed and Sealed this  
Ninth Day of June, 2015

Michelle K. Lee  
*Director of the United States Patent and Trademark Office*